(12) United States Patent
Branson et al.

(10) Patent No.: US 7,478,330 B1
(45) Date of Patent: Jan. 13, 2009

(54) SYSTEMS AND METHODS INVOLVING IMPROVED WEB BROWSING

(75) Inventors: Michael J. Branson, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/112,813

(22) Filed: Apr. 30, 2008

(51) Int. Cl.
*G06F 3/00* (2006.01)
*G06F 3/048* (2006.01)

(52) U.S. Cl. .................. 715/738; 715/234; 715/760; 715/764; 715/765

(58) Field of Classification Search .......... 715/234, 715/738, 76, 764–765; 709/227
See application file for complete search history.

(56) References Cited

U.S. PATENT DOCUMENTS

| | | | |
|---|---|---|---|
| 6,609,146 B1 * | 8/2003 | Slotznick ............... | 709/200 |
| 6,678,007 B2 * | 1/2004 | Nason et al. ............. | 348/564 |
| 6,708,172 B1 * | 3/2004 | Wong et al. ............. | 707/10 |
| 6,918,066 B2 | 7/2005 | Dutta et al. | |
| 6,983,331 B1 * | 1/2006 | Mitchell et al. ........... | 709/246 |
| 7,203,737 B2 * | 4/2007 | Starbuck et al. .......... | 709/219 |
| 7,325,045 B1 * | 1/2008 | Manber et al. ........... | 709/219 |
| 7,356,575 B1 * | 4/2008 | Shapiro ................. | 709/220 |
| 2002/0095522 A1 * | 7/2002 | Hayko et al. ............ | 709/311 |
| 2002/0143859 A1 * | 10/2002 | Kuki et al. .............. | 709/203 |
| 2003/0154261 A1 * | 8/2003 | Doyle et al. ............. | 709/218 |
| 2003/0236799 A1 * | 12/2003 | Kiohane et al. ........... | 707/203 |
| 2005/0080667 A1 * | 4/2005 | Knott et al. ............. | 705/14 |
| 2005/0132334 A1 * | 6/2005 | Busfield ................. | 717/124 |
| 2005/0177597 A1 | 8/2005 | Elmer | |
| 2005/0246444 A1 * | 11/2005 | Koehane et al. .......... | 709/227 |
| 2006/0168543 A1 * | 7/2006 | Zaner-Godsey et al. ..... | 715/835 |
| 2006/0230344 A1 * | 10/2006 | Jennings et al. .......... | 715/522 |

OTHER PUBLICATIONS

Moran, Joseph, et al. "Running Multiple Operating Systems on your Windows PC" Sep. 18, 2006.*
Heng, Christopher et al. "How to check your website with multiple browsers one a single machine" 2003 □.*

* cited by examiner

*Primary Examiner*—Steven B Theriault
(74) *Attorney, Agent, or Firm*—Cantor Colburn LLP

(57) ABSTRACT

An exemplary method for displaying web content, the method comprising, receiving a website address in a global browser, determining whether the website address is stored in a preferred browser database, retrieving a preferred browser profile including a preferred browser indicator and plug-in indicator associated with the website address from the preferred browser database if the website address is stored in the preferred browser database, displaying the web content with the preferred browser in a presentation window of the global browser, determining whether an error has occurred in displaying the web content with the preferred browser, opening a default browser if an error has occurred in displaying the web content with the preferred browser, and displaying the web content with the default browser in a presentation window of the global browser if an error has occurred in displaying the web content with the preferred browser.

1 Claim, 10 Drawing Sheets

SYSTEMS AND METHODS INVOLVING IMPROVED WEB BROWSING

BACKGROUND OF THE INVENTION

1. Field of the Invention

This invention relates generally to a method for improving web page browsing, and particularly to presenting web material in a proper format.

2. Description of Background

Many Internet web pages may be used most effectively by a particular web browser. For example, a web page may display web content when viewed by one type of web browser differently than when viewed by another type of web browser. Users may have to use different web browsers to effectively display different web pages. A method that effectively displays web content is desired.

SUMMARY OF THE INVENTION

The shortcomings of the prior art are overcome and additional advantages are achieved through an exemplary method for displaying web content, the method comprising, receiving a website address in a global browser, determining whether the website address is stored in a preferred browser database, retrieving a preferred browser profile including a preferred browser indicator and plug-in indicator associated with the website address from the preferred browser database responsive to determining that the website address is stored in the preferred browser database, opening the preferred browser responsive to retrieving the preferred browser profile, requesting web content from the website address with the preferred browser, displaying the web content with the preferred browser in a presentation window of the global browser, determining whether an error has occurred in displaying the web content with the preferred browser, opening a default browser responsive to determining that an error has occurred in displaying the web content with the preferred browser, requesting web content from the website address with the default browser responsive to determining that an error has occurred in displaying the web content with the preferred browser, displaying the web content with the default browser in a presentation window of the global browser responsive to determining that an error has occurred in displaying the web content with the preferred browser, opening a default browser responsive to determining that the website address is not stored in the preferred browser database; requesting web content from the website address with the default browser responsive to determining that the website address is not stored in the preferred browser database, and displaying the web content with the default browser in a presentation window of the global browser responsive to determining that the website address is not stored in the preferred browser database.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Methods involving displaying web content are provided. Several exemplary methods are described.

Internet webpages contain a variety of different types of web content such as, for example, links to other webpages, text, graphics, sounds, and images. Many web pages are designed to be accessed by a specific web browser. Since there are numerous types of web browsers available to users, a user may access a website with a browser that will not properly display (or present) the web content on a website. If web content is not properly displayed with a particular browser, a user may resort to a trial and error method to determine which web browser best displays the web content. A system and method that determines a preferred web browser for a particular website with web content is desired.

Figure 1:
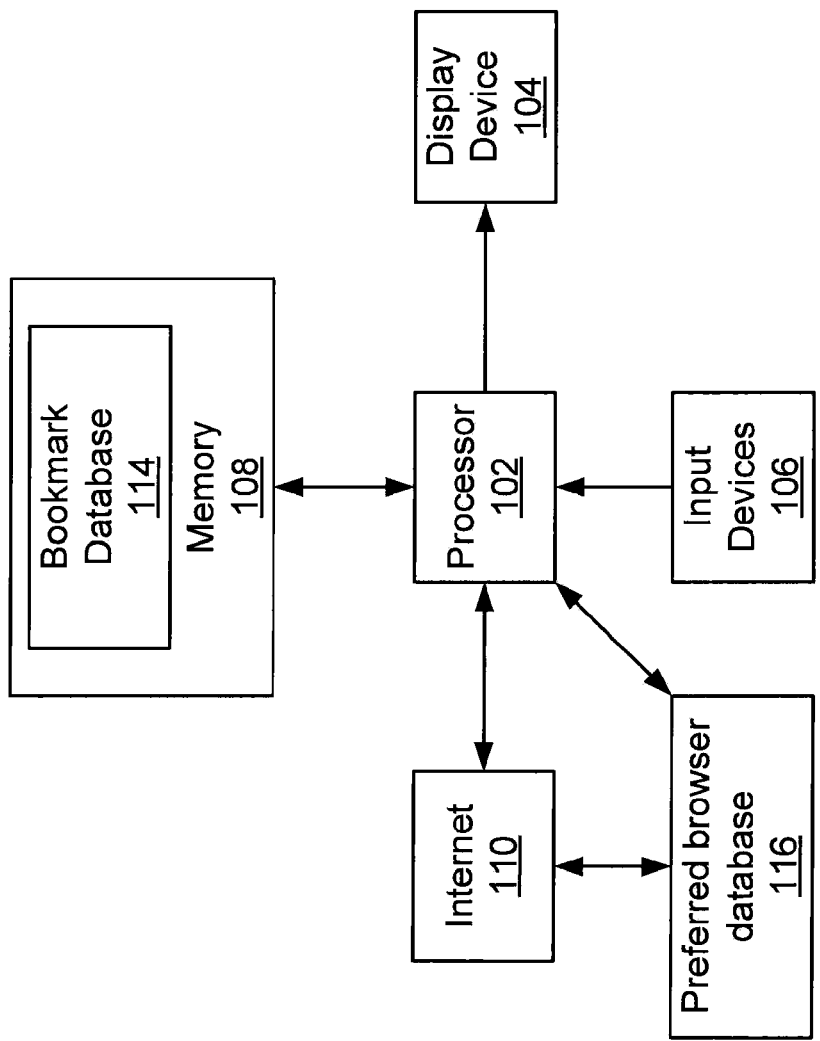
FIG. 1 is a block diagram of an exemplary system for displaying web content.

In this regard, an exemplary system for displaying web content is shown in FIG. 1. FIG. 1 includes a user computer having a processor 102 communicatively connected to a display device 104, input devices 106, memory 108, and the Internet 110. The memory may include a bookmark database 114. A preferred browser database 116 may be communicatively connected to the processor 102 via the Internet 110 or via another communications path, such as, for example, a local area network. The preferred browser database 116 may also be stored in the memory 108.

Figure 2:
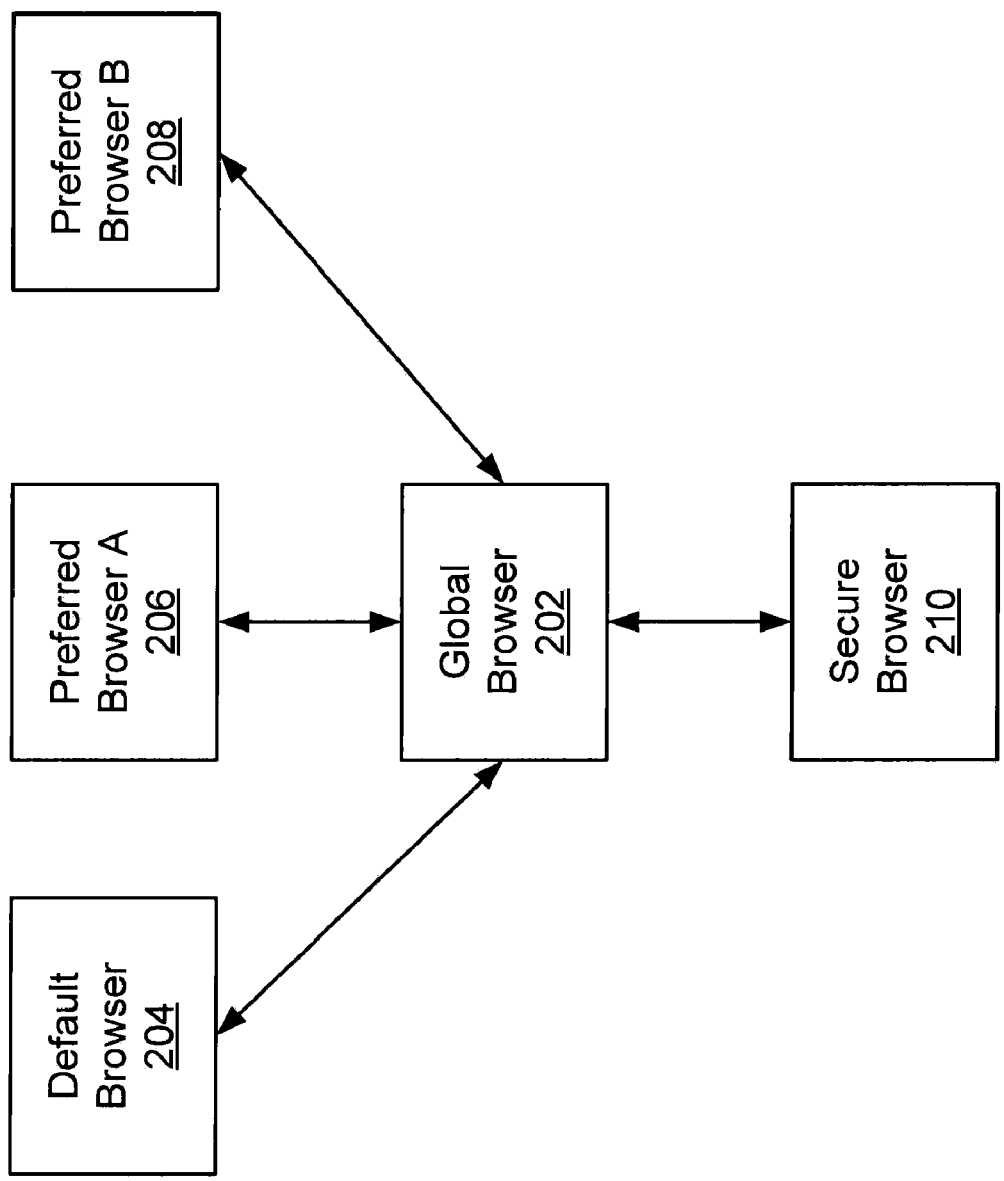
FIG. 2 is a block diagram further illustrating the system for displaying web content.
Figure 4:
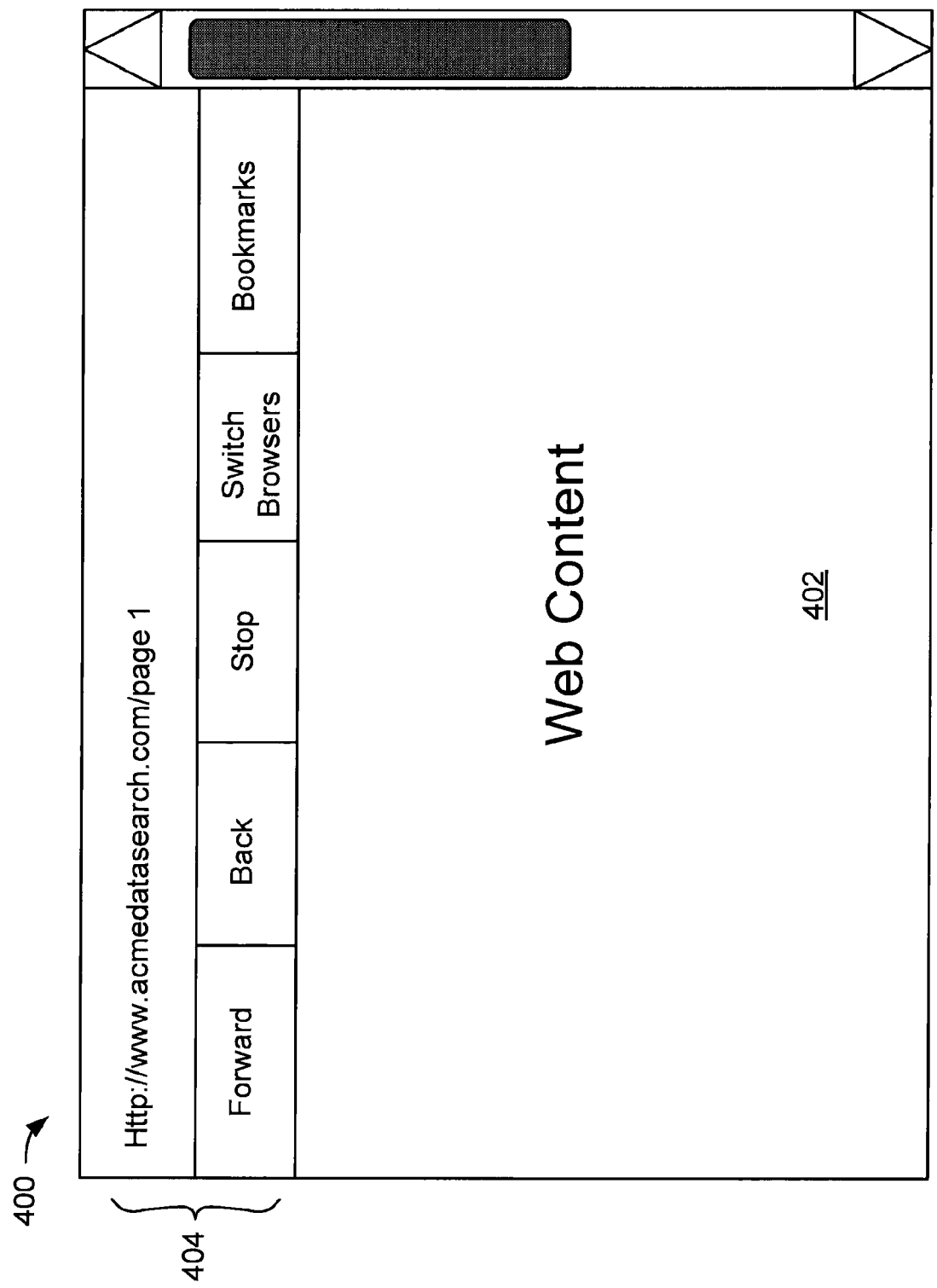
FIG. 4 illustrates and exemplary embodiment of a global web browser display.

FIG. 2 illustrates a block diagram of a relationship between web browsers that may be used by the processor 102 (of FIG. 1). The global browser 202 is a web browser that has a user interface similar to other types of known web browsers. An exemplary embodiment of a user interface of the global browser 202 is shown in FIG. 4. Referring to FIG. 4, the user interface includes a window 400 that has a web content window 402 and controls 404. The global browser 202 may receive and send website addresses to additional browsers including: a default browser 204, a preferred browser A 206, a preferred browser B 208, and a secure browser 210 (of FIG. 2). The global browser 202 may direct the additional browsers to retrieve and process web content from a website address, and display the web content in the web content window 402. The interface of the global browser 202 allows a user to control the additional browser that is displaying the web content.

For example, a user may input a website address into the global browser 202. The global browser 202 directs the default browser 204 to retrieve and process the web content from the website. The processed web content is then displayed in the web content window 402. The controls 404 may be used to control the default browser 204. Thus, the user may view the user interface 400 of the global browser 202 while viewing the web content as processed by the default browser.

In other embodiments, the global browser 202 may direct a number of the additional browsers to retrieve and process the web content from a website simultaneously or in series. The global browser 202 may determine which additional browser best displays the web content. Once determined, the additional browser that best displays the web content will display the web content in the web content window 402. A user may also selectively switch between the additional browsers to manually determine which additional browser the user prefers based on the displayed content. If a user has determined which browser is the preferred browser, the user may designate the preferred browser. The preferred browser will be saved in the preferred browser database 116.

To increase the speed and efficiency of the method, the preferred browser database 116 may include website addresses and associated preferred browsers that may properly display the web content. When a website address is received by the global browser 202, the global browser 202 may access the preferred browser database 116 to determine if the website address and an associated preferred browser is saved in the preferred browser database 116. If the website address is present in the preferred browser database 116, the global browser 202 may direct the preferred browser to retrieve, process, and display the web content. A more detailed explanation including alternate methods are described below.

The preferred browser database 116 may be stored locally in the memory 108, or on a remote server and accessed via a local area network or the Internet 110. Portions or the entirety of the preferred browser database 116 may be available to the user, a defined group of users, or the public. A web developer may add entries to the preferred browser database 116. For example, a website author may add the website address and a preferred browser to the preferred browser database 116 once the author determines a preferred browser for the web content on the website. In alternate embodiments, the preferred browser for the web content may be associated with metadata for the web content by a website author. Thus, the preferred browser may be determined by receiving metadata including the preferred browser with the web content.

Figure 3:
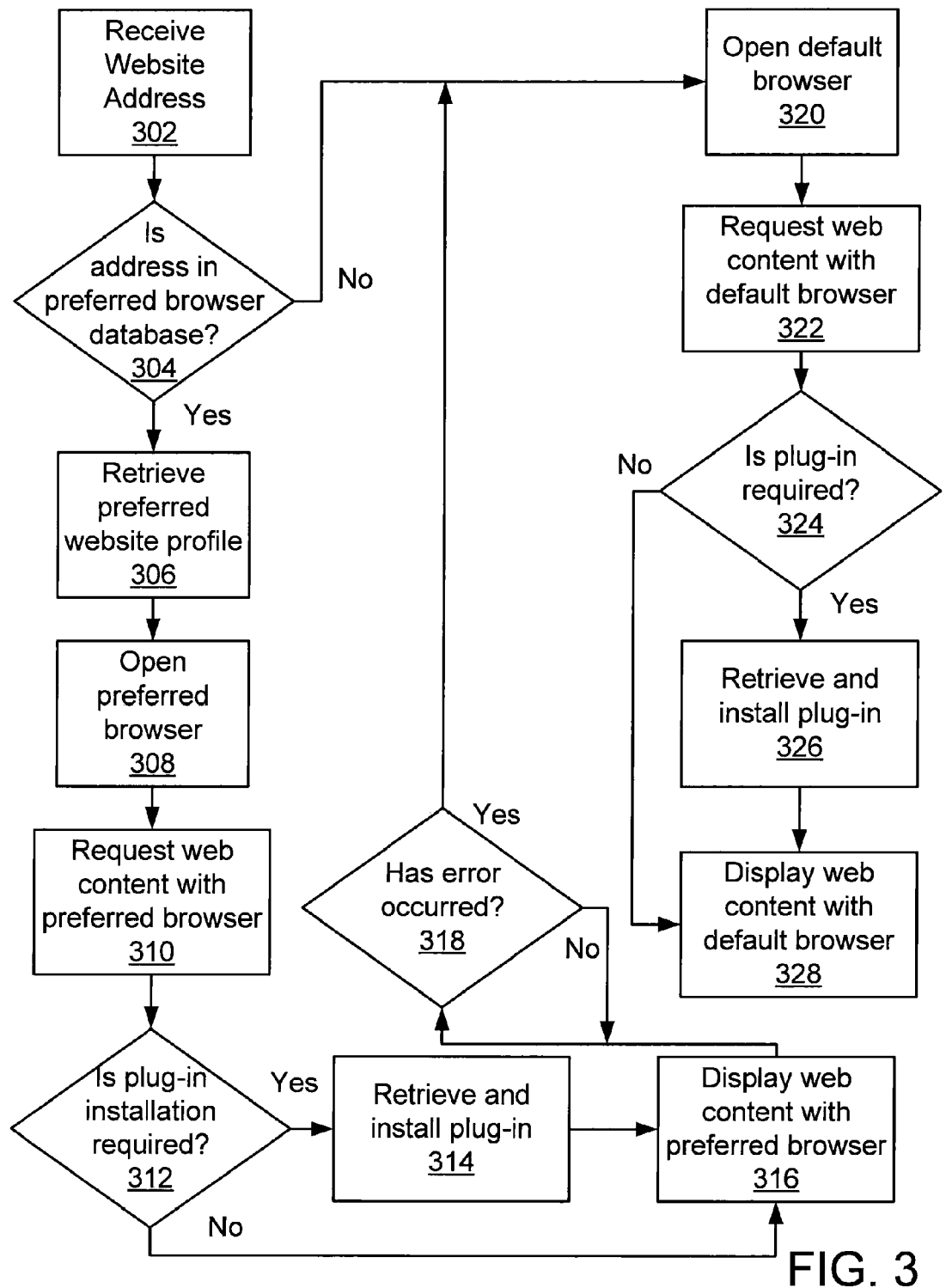
FIG. 3 illustrates a block diagram of an exemplary method for displaying web content.

FIG. 3 illustrates a block diagram of an exemplary method for displaying web content. In block 302, a website address is received by the global browser 202 (of FIG. 2). The global browser 202 determines whether the website address is stored in the preferred browser database 116 in block 304. If the website address is stored in the preferred browser database 116, the global browser 202 retrieves a website profile associated with the website address from the preferred browser database in block 306. The website profile may contain a preferred browser indicator that includes a preferred browser that will properly present the web content at the website address. The website profile may also contain additional information, such as, for example, plug-ins associated with the website, and whether the website is secure.

Once the website profile is retrieved, the preferred browser is opened in block 308. In block 310, the preferred browser requests the web content from the website address. In block 312, the global browser may determine if a plug-in is associated with the website address. If a plug-in is associated with the website address, and the plug-in is not installed on the preferred browser, the plug-in is retrieved, for example, via the Internet, and installed on the preferred browser in block 314. The global browser 202 may direct the preferred browser to retrieve and install the plug-in, or the global browser 202 may retrieve the plug-in and install the plug-in on the preferred browser. Once the plug-in is installed, or if a plug-in installation is not needed, the web content is displayed by the preferred browser in the content window 402 (of FIG. 4).

In block 318, the global browser 202 determines whether an error has occurred in the presentation of the web content. If an error has occurred, the method moves to block 320. In block 320 the global browser 202 opens a default browser. Block 320 may be initiated when an error occurs in block 318, or if it is determined that the website address is not present in the preferred browser database 116 in block 304. Once the default browser is opened, the default browser requests the web content in block 322. The determination of whether a plug-in installation is needed is made in block 324, and if a plug-in installation is needed, the plug-in is retrieved and installed in block 326 in a similar manner as described above regarding block 314. The default browser may then display the web content in the content window 402 (of FIG. 4).

As discussed above, the website profile may also contain a security indicator for the website address. If the website security indicator indicates that the website address is not trusted, the secure browser 210 may be designated as the preferred browser.

Figure 5A:
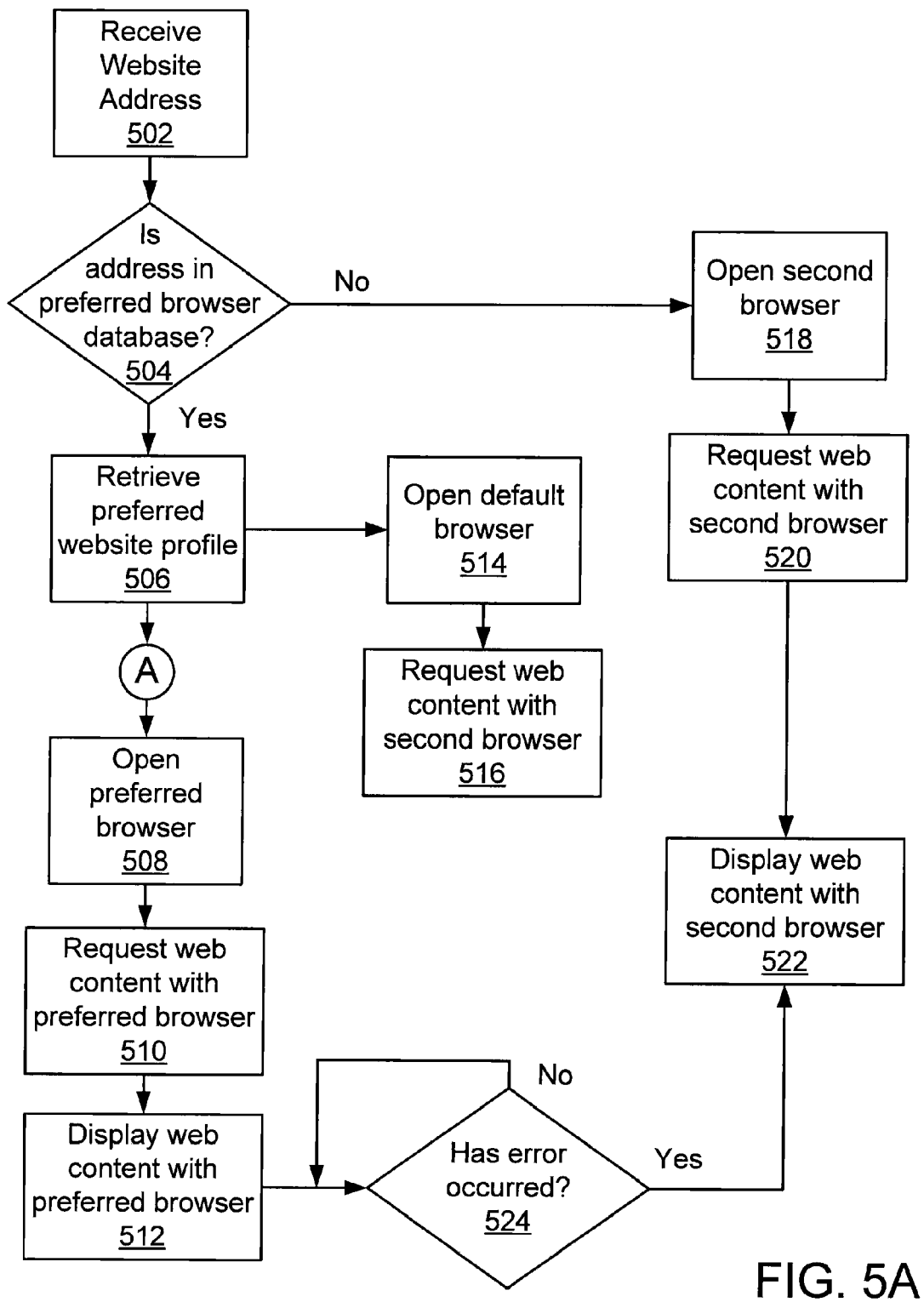
FIGS. 5A-5B illustrate a block diagram of an alternate exemplary method for displaying web content.
Figure 5B:
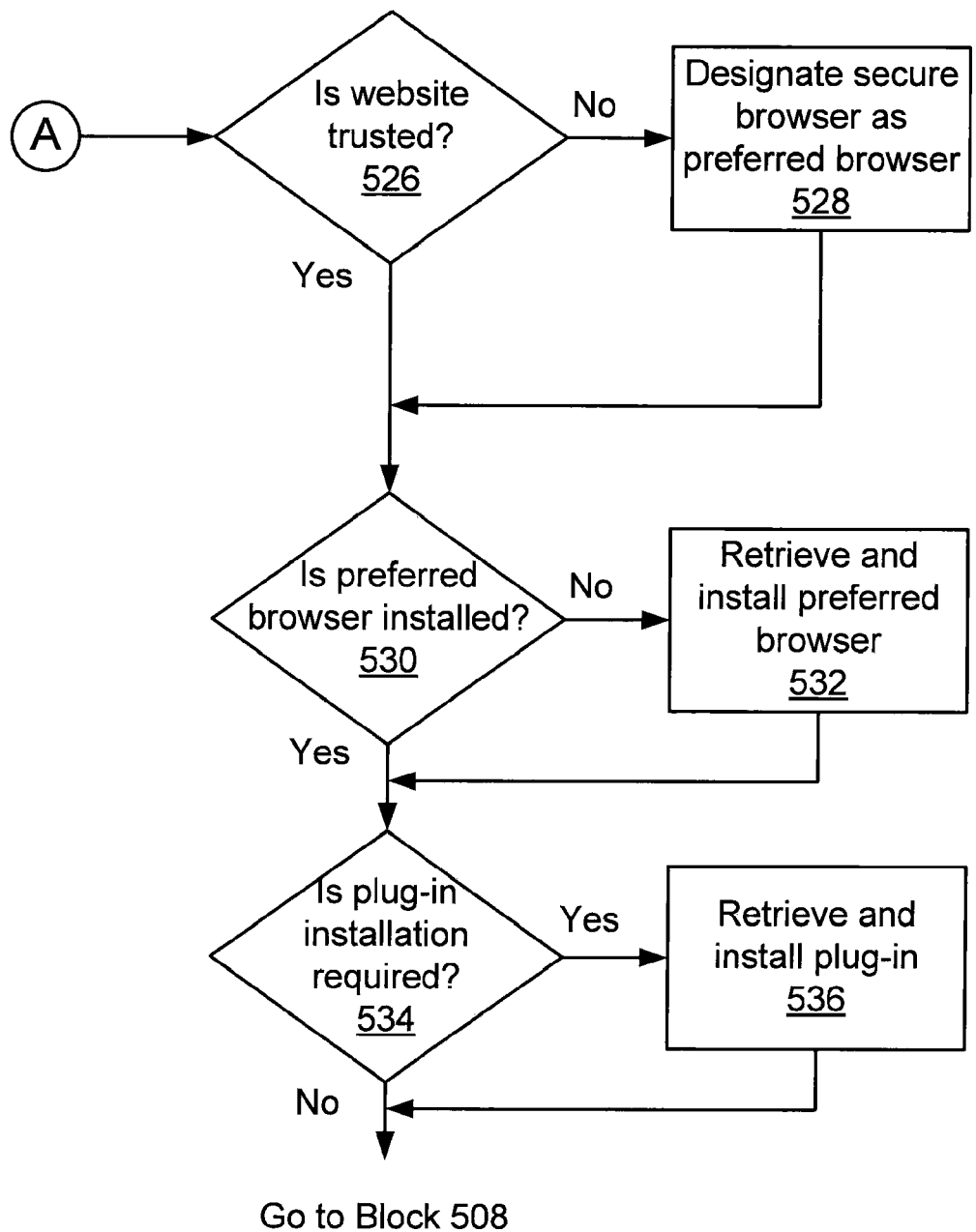

FIGS. 5A and 5B illustrate an alternate method for displaying web content. In block 502, a website address is received by the global browser 202 (of FIG. 2). The global browser 202 determines whether the website address is stored in the preferred browser database 116 in block 504. If the website address is stored in the preferred browser database 116, the global browser 202 opens a second browser in block 518. The second browser requests web content in block 520. In block 522, the second browser displays the web content in the content window 402 (of FIG. 4).

If the website address is stored in the preferred browser database 116, the global browser 202 retrieves a website profile associated with the website address from the preferred browser database in block 506. The second browser is opened in block 514. The second browser requests the web content in block 516. Referring to A in FIG. 5B, it is determined from the website profile whether the website is trusted in block 526. If the website is not trusted, the secure browser 210 (of FIG. 2) is designated as the preferred browser in block 528. In block 530 it is determined whether the preferred browser is installed on the user computer. If the preferred browser is not installed, the global browser 202 may retrieve and install the preferred browser in block 532. A determination of whether a plug-in associated with the website address is needed in block 534. If the plug-in is needed, it is retrieved and installed in block 536. Referring back to FIG. 5A, the preferred browser is opened in block 508. The web content is requested by the preferred browser in block 510. In block 512, the web content is displayed by the preferred browser in the content window 402 (of FIG. 4). If an error has occurred in the presentation of the web content in block 524, the second browser displays the web content in the content window 402 (of FIG. 4).

Figure 6:
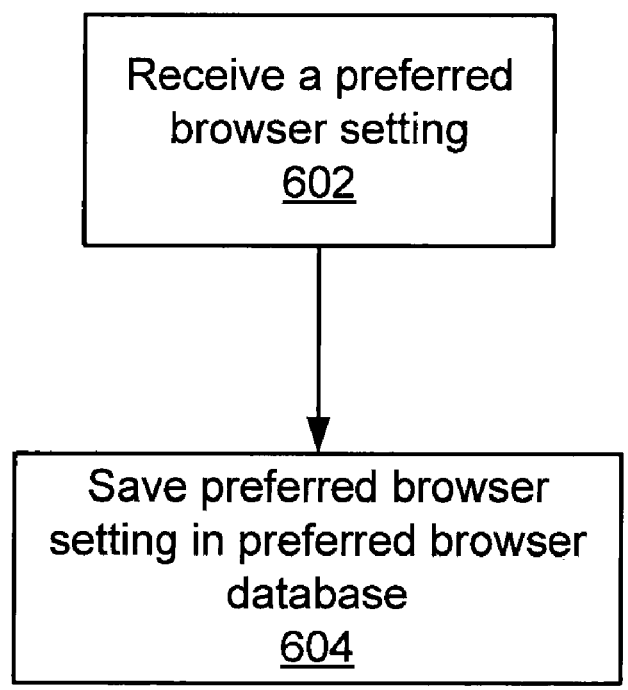
FIG. 6 illustrates a block diagram of another alternate exemplary method for displaying web content.

FIG. 6 illustrates an exemplary embodiment of a method of receiving a preferred browser setting associated with a website address in block 602, and saving the preferred browser setting and the associated website address in the preferred browser database 116 in block 604.

Similar methods as those described above may be used to update the preferred browser database 116, so that the preferred browser with the needed plug-ins is available to the user for website addresses that may be accessed by the user at a future time. For example, the user may enter a list of website addresses into the bookmark database 114. The global browser 202 may access a website address from the bookmark database 114 and determine whether a preferred browser is associated with the website address in the preferred browser database 116. The global browser 202 may then determine if the preferred browser is appropriate, has the necessary plug-ins installed, or if an alternate browser should be used. A detailed explanation of the above method is described below.

Figure 7A:
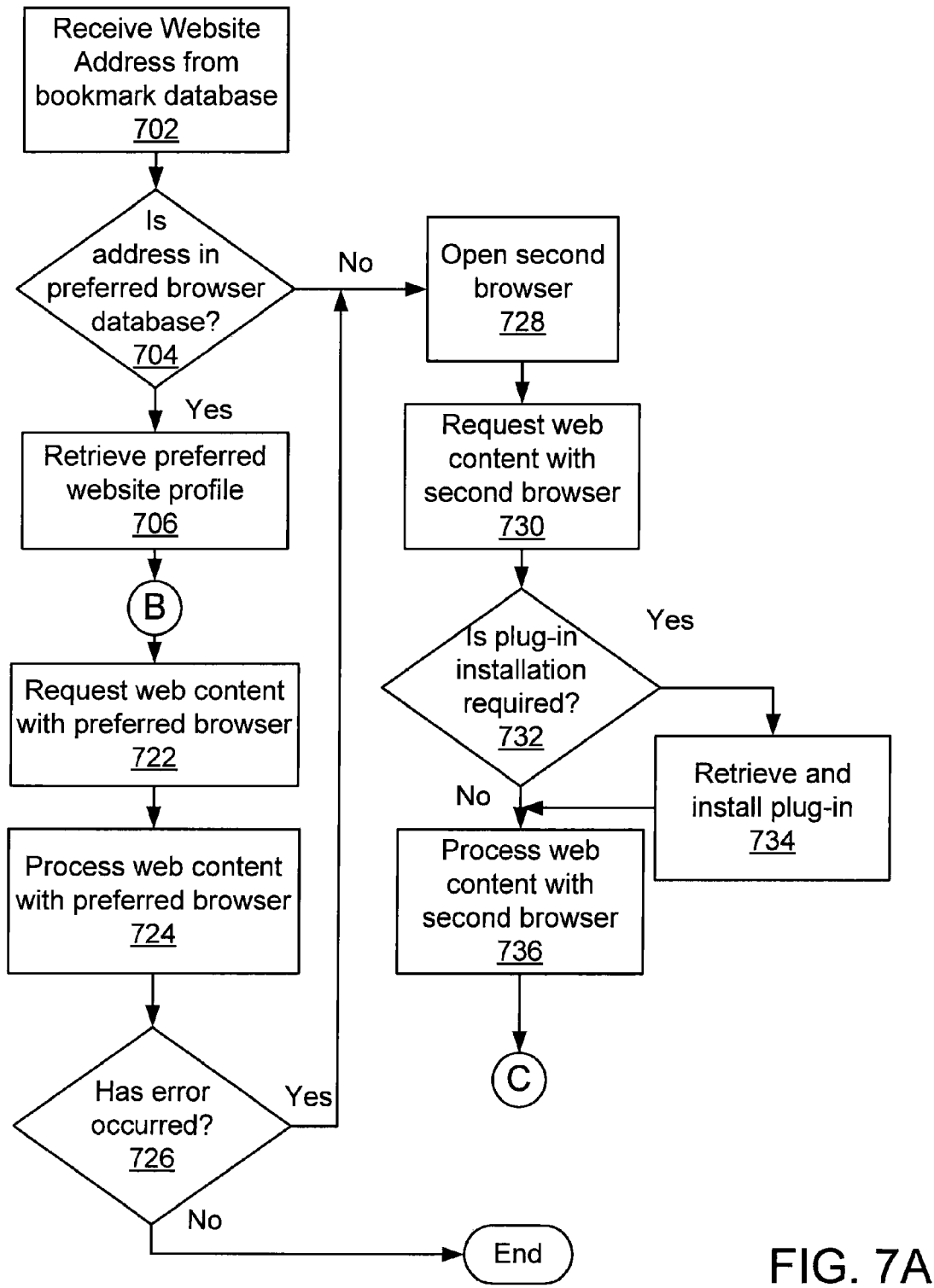
FIGS. 7A-7C illustrate a block diagram of another alternate exemplary method for processing and displaying web content.
Figure 7B:
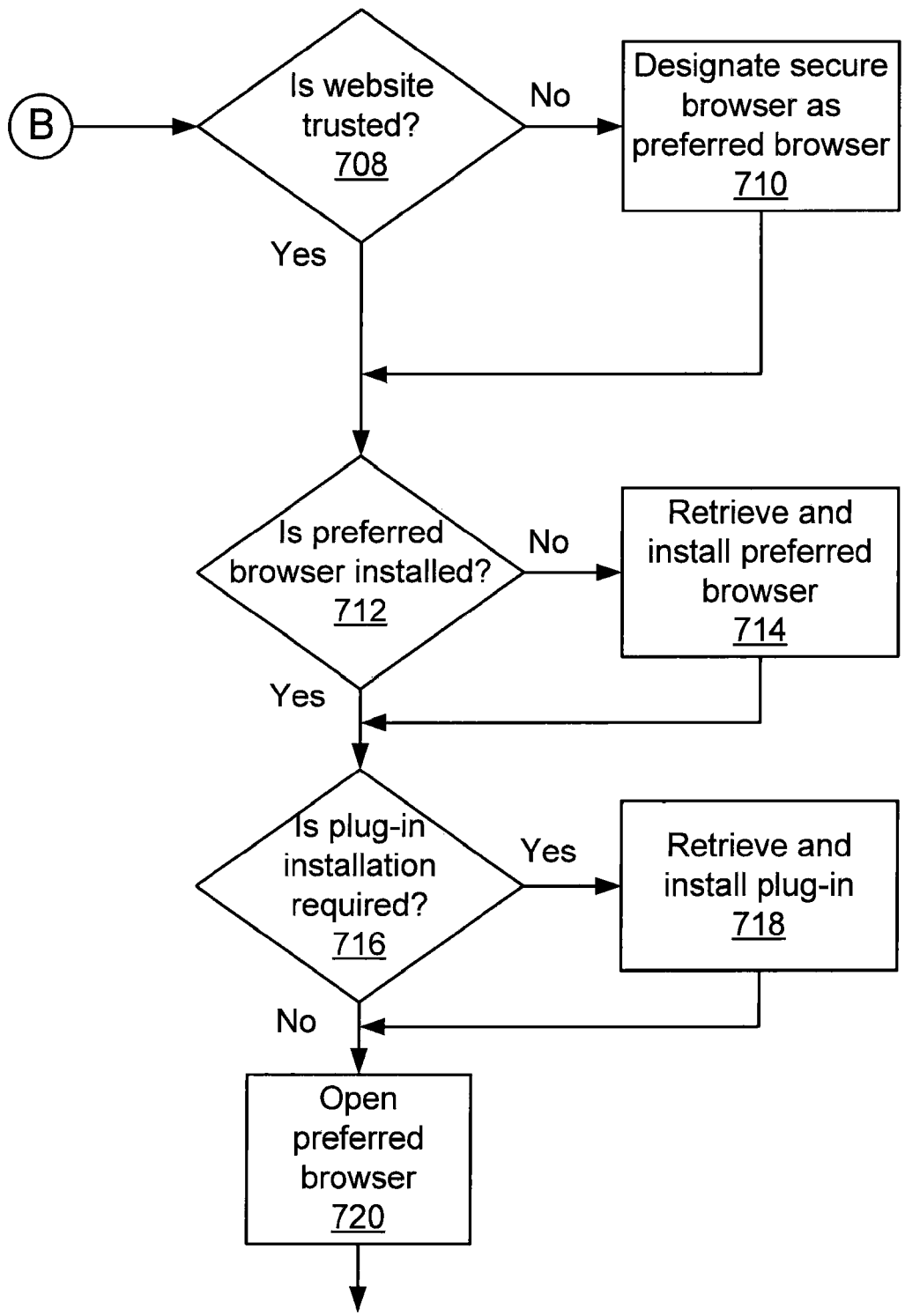
Figure 7C:
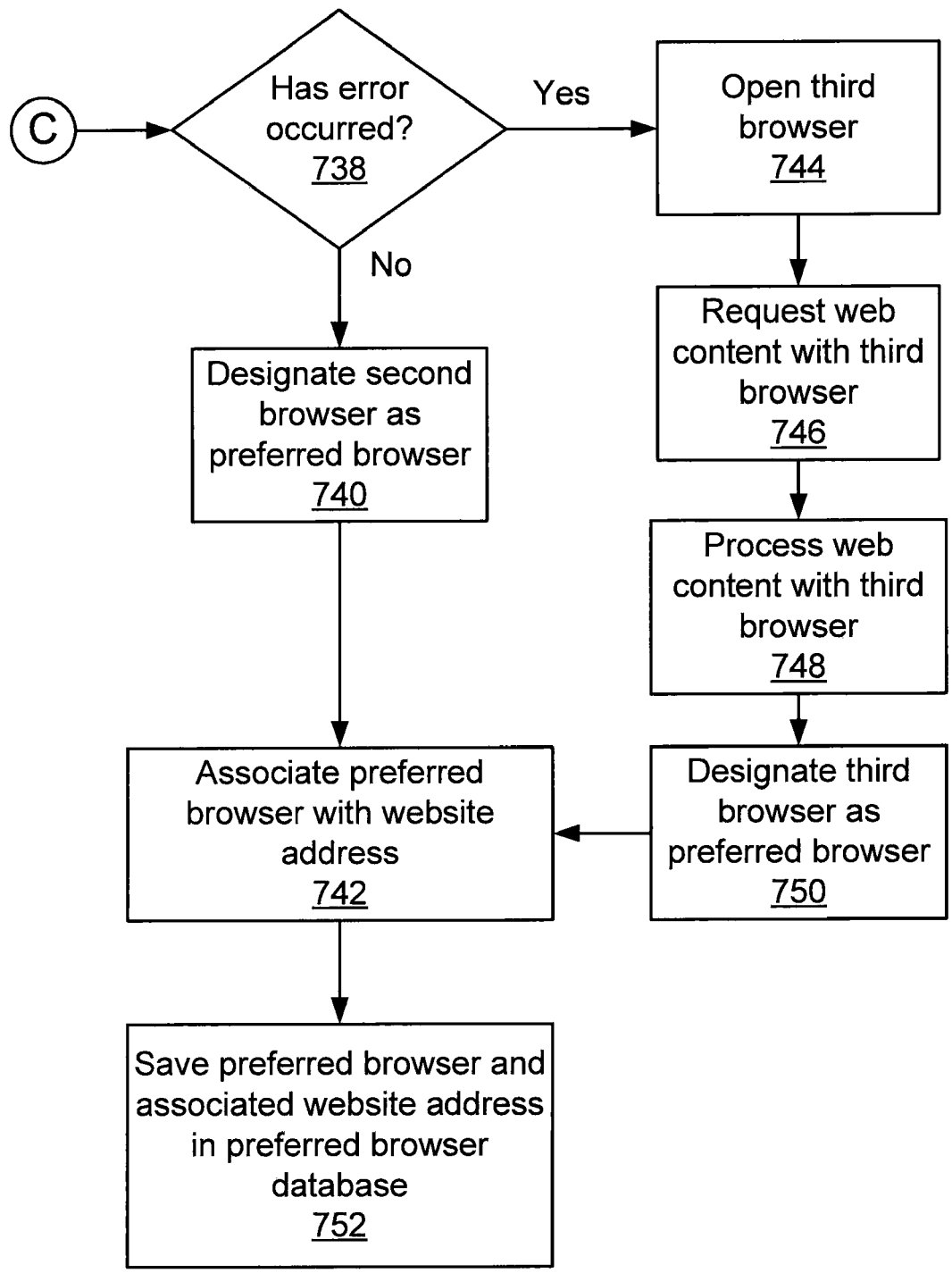

FIGS. 7A-7C illustrate a block diagram of an exemplary method for configuring the browsers on a user computer to increase the speed of displaying the web content when requested. Referring to FIG. 7A, the global browser 202 (of FIG. 2) receives a website address from the bookmark database 114 in block 702. The global browser 202 determines whether the website address is present in the preferred browser database 116 in block 704. If the website address is present in the preferred browser database 116, the preferred website profile is retrieved in block 706. Referring to FIG. 7B, in block 708 it is determined whether the website address has a security indication as trusted. If the website address is not trusted, the secure browser 210 is designated as the preferred browser in block 710. In block 712 it is determined whether the preferred browser is installed on the user computer. If the preferred browser is not installed, the preferred browser is retrieved and installed on the user computer in block 714. In block 716 it is determined whether a needed plug-in is installed. If the plug-in is not installed, the plug-in is retrieved and installed in block 718. The preferred browser is opened in block 720. The method then moves to block 722 in FIG. 7A.

Referring back to FIG. 7A, web content is requested with the preferred browser in block 722. In block 724 the preferred browser processes the web content. In processing, the preferred browser processes the web content for presentation to the user. In processing, an error in presenting the web content may be experienced by the preferred browser. In block 726, it is determined whether an error has occurred in processing the web content with the preferred browser. If an error has not occurred, the method ends, and the global browser 202 may repeat the process with another website address from the bookmark database 114. If an error has occurred, or the website address is not present in the preferred browser database 116 (as determined in block 704, a second browser is opened in block 728. In block 730, the second browser requests the web content. In block 732 it is determined whether a needed plug-in is installed. If the plug-in is not installed, the plug-in is retrieved and installed in block 734. The second browser processes the web content in block 736. The method is continued in FIG. 7C.

Referring to FIG. 7C, in block 738 it is determined whether an error has occurred in processing the web content with the second browser. If an error has not occurred, the second browser is designated as the preferred browser in block 740. If an error has occurred, a third browser may be opened in block 744. The third browser requests the web content in block 746. The third browser processes the web content in block 748. The third browser is designated as the preferred browser in block 750. In block 742, the preferred browser is associated with the website address. In block 752, the preferred browser and the associated website address may be saved in the preferred browser database 116. An error may be determined automatically by the global browser or visually by the user. If a user visually detects an error, the user may enter an indicator that the error has occurred.

The above-described method includes a third browser that may be opened if the second browser experiences errors in processing the web content. The above method is not limited to only a third browser, but may include additional browsers that may be used to process the web content in a similar manner to the second browser. Thus, the third browser may also check for errors and a fourth browser may be opened if errors are found with the third browser.

The preferred browser database 116 may be stored locally in the memory 108, or on a remote server and accessed via a local area network or the Internet 110. Portions or the entirety of the preferred browser database 116 may be available to the user, a defined group of users, or the public. A web developer may add entries to the preferred browser database 116. For example, a website author may add the website address and a preferred browser to the preferred browser database 116 once the author determines a preferred browser for the web content on the website.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for displaying web content in a system, the method comprising:

receiving a website address in a global browser;

determining whether the website address is stored in a preferred browser database;

retrieving a preferred browser profile including a preferred browser indicator and plug-in indicator associated with the website address from the preferred browser database responsive to determining that the website address is stored in the preferred browser database;

determining whether the website address is a trusted website address;

designating a secure browser as the preferred browser responsive to determining that the website address is not a trusted website address:

determining whether the preferred browser is installed in the system:

retrieving the preferred browser responsive to determining that the preferred browser is not installed in the system:

installing the preferred browser in the system responsive to retrieving the preferred browser:

opening the preferred browser;

requesting web content from the website address with the preferred browser;

displaying the web content with the preferred browser in a presentation window of the global browser;

determining whether an error has occurred in displaying the web content with the preferred browser;

opening a default browser responsive to determining that an error has occurred in displaying the web content with the preferred browser;

requesting web content from the website address with the default browser responsive to determining that an error has occurred in displaying the web content with the preferred browser;

displaying the web content with the default browser in a presentation window of the global browser responsive to determining that an error has occurred in displaying the web content with the preferred browser;

opening a default browser responsive to determining that the website address is not stored in the preferred browser database;

requesting web content from the website address with the default browser responsive to determining that the website address is not stored in the preferred browser database; and displaying the web content with the default browser in a presentation window of the global browser responsive to determining that the website address is not stored in the preferred browser database.

* * * * *